8834X
P. C. Curtis,
Force Pump,
Patented May 22, 1835
NO PRINTED COPY OF SPECIFICATION IN OFFICE.
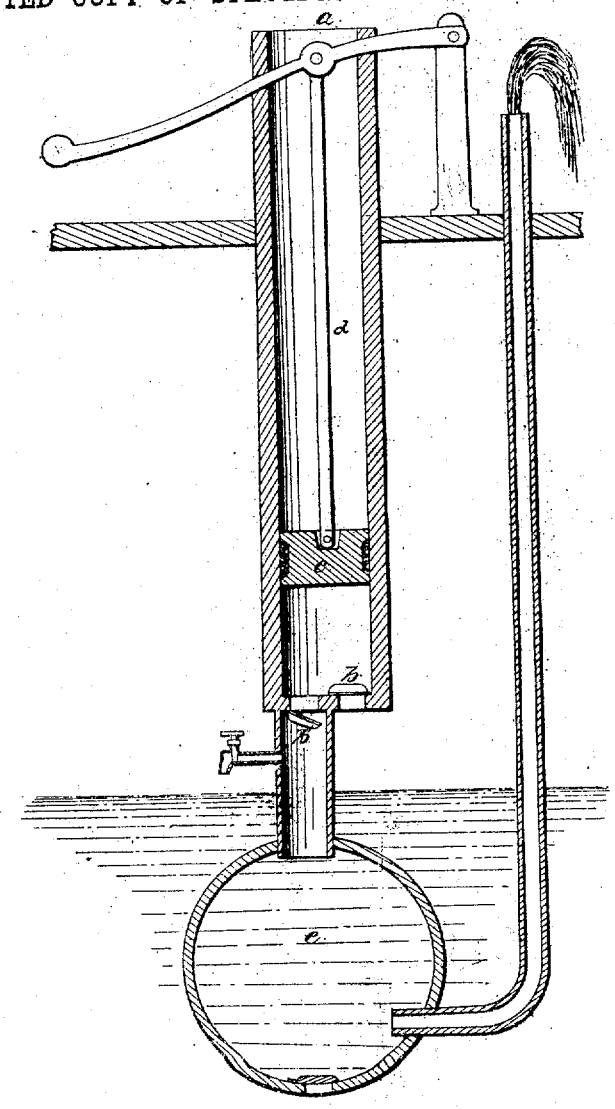

aw (1)

8834X May 22. 1835 [illegible]

Philo C. Curtis
Letters Patent

The Schedule referred to in these Letters Patent and making part of the same containing a description in the words of the said Philo C. Curtis himself of his improvement in the construction of a pump for raising water and other liquids.

To all to whom these presents shall come. Be it known that I Philo C. Curtis of Utica in the County of Oneida and State of New York have invented a new and useful improvement in the construction of pumps for raising water or other liquids and that the following is a full and exact description of the construction and operation of the said machine as invented or improved by me. I form a cylinder similar to those in use for common air or water pumps proportioned in size to the quantity of water or other liquid to be raised I furnish the bottom of the Cylinder with two valves one opening upwards and the other downward, the piston may be made wholly of metal or for packing in the ordinary manner the lever for working the pump is connected to the piston by a rod which is inserted in a mortice in the piston it also secured in the lever by a pin in such manner as to form a joint the lever is supported at one end by a stand on the same platform that supports the pump or as may be most convenient I fasten a tube over the valve that opens downward which tube extends from the pump to a vessel made either of wood or metal which is placed in the fountain from which it is designed to raise water. this is prepared with a valve on the inside at the bottom opening upward there is also another tube leading from near the bottom of said Drawing made said vessel to the pump or to any other place where the
water is wanted ; . I insert a cock in the tube leading from
the pump near the pump, the operation of this pump is sim-
ilar to the common forcing pump with the exception that
it is necessary to open the cock in the pipe and let the air
escape from the vessel in the fountain and the water to enter
when it must be again closed to continue the opperation it
will be most convenient in opperating this pump to leave
the cock open at all times after pumping by that means
the vessel in the fountain will be full of water and afford the neces-
sary quantity without waiting for it to fill. I design
making the vessel of iron in the form of a globe to hold
from four to six gallons for common use. the advantages
to be obtained from the use of this pump are firstly the ease
of raising the water in consequence of a steady stream produced
by the elasticity of the air. secondly its durability owing
to its being worked with air instead of water thirdly
its being secure from frost as there is but a simple tube
to convey the water which it is not necessary to provide
with a valve in the bottom except in case of extreme length
or height and lastly its neatness being well calculated for the
use of families and for public houses for water beer &c. —
What I claim as my improvement in the above described
pump consists principally in arranging the parts in a
form that water or other liquids can be raised advantage-
ously without entering the body of the pump by means of a vessel as
described above and tube leading to the — crane from the
pump provided with a cock to enable the person working the
pump to fill and discharge the vessel with air and water alter-
nately. I also claim as my improvement the solid metal piston.

Witness
John A. Kittle
Ira Barnum

Philo C. Curtis

[illegible]

[67/[illegible]]